US008914476B2

(12) United States Patent
Justen et al.

(10) Patent No.: US 8,914,476 B2
(45) Date of Patent: Dec. 16, 2014

(54) METHOD FOR AUTOMATICALLY CONFIGURING DEVICES IN TELECOMMUNICATION NETWORKS AND DEVICES FOR USE WITH SUCH METHODS

(75) Inventors: Pascal Justen, Brussels (BE); Christoph Stevens, Stekene (BE); Sven Van Den Bosch, Lochristi (BE); Jan Coppens, Ghent (BE); Willem Acke, Rijmenam (BE)

(73) Assignee: Alcatel Lucent, Boulogne-Billancourt (FR)

( * ) Notice: Subject to any disclaimer, the term of this patent is extended or adjusted under 35 U.S.C. 154(b) by 1033 days.

(21) Appl. No.: 12/385,236

(22) Filed: Apr. 2, 2009

(65) Prior Publication Data

US 2009/0252062 A1 Oct. 8, 2009

(30) Foreign Application Priority Data

Apr. 4, 2008 (EP) .................................... 08290333

(51) Int. Cl.
*G06F 15/177* (2006.01)
*H04L 5/14* (2006.01)
*G06F 9/44* (2006.01)
*H04L 29/08* (2006.01)
*H04L 5/00* (2006.01)

(52) U.S. Cl.
CPC ................ *H04L 5/1438* (2013.01); *G06F 8/71* (2013.01); *H04L 5/0007* (2013.01); *H04L 67/02* (2013.01)
USPC ....................................... 709/220

(58) Field of Classification Search
USPC ....................................... 709/220
See application file for complete search history.

(56) References Cited

U.S. PATENT DOCUMENTS

| 7,395,322 | B2 * | 7/2008 | Harvey et al. ................. 709/220 |
| 8,009,665 | B2 * | 8/2011 | Cioffi et al. ................... 370/352 |
| 2001/0034771 | A1 * | 10/2001 | Hutsch et al. ................. 709/217 |
| 2004/0261116 | A1 * | 12/2004 | Mckeown et al. ............ 725/109 |
| 2005/0132028 | A1 * | 6/2005 | Lester et al. .................. 709/222 |
| 2006/0120305 | A1 * | 6/2006 | Van Den Bosch et al. ... 370/254 |
| 2006/0190575 | A1 * | 8/2006 | Harvey et al. ................. 709/222 |
| 2008/0137673 | A1 * | 6/2008 | Phuah et al. .................. 370/401 |
| 2008/0212495 | A1 * | 9/2008 | Stirbu .......................... 370/254 |
| 2008/0298444 | A1 * | 12/2008 | Cioffi et al. ................... 375/222 |
| 2009/0138393 | A1 * | 5/2009 | Lemons et al. ................ 705/35 |

FOREIGN PATENT DOCUMENTS

EP 1 750 469 2/2007

OTHER PUBLICATIONS

"TR-069 CPE WAN Management Protocol v1.1 Issue 1 Amendment 2", published Dec. 1, 2007, pp. 1-138.

* cited by examiner

*Primary Examiner* — Peling Shaw
(74) *Attorney, Agent, or Firm* — Harness, Dickey & Pierce

(57) ABSTRACT

A method for automatically configuring a device by means of an automatic configuration means adapted for automatically configuring the device by means of a remote management protocol (RMP), comprising setting up an RMP session between the device and the automatic configuration means is disclosed, wherein when during the RMP session at least one parameter value of the object model of the device is changed, the device communicates the changed parameter value(s) to the automatic configuration means after the initiation and before the termination of the RMP session.

11 Claims, 5 Drawing Sheets

METHOD FOR AUTOMATICALLY CONFIGURING DEVICES IN TELECOMMUNICATION NETWORKS AND DEVICES FOR USE WITH SUCH METHODS

TECHNICAL FIELD OF THE INVENTION

The present invention relates to the field of data and telecommunication networks.

BACKGROUND OF THE INVENTION

The DSL Forum is an international industry consortium of service providers, equipment and component manufacturers and other interested parties, focussing on developing broadband DSL. The DSL Forum develops technical specifications and indirectly standards that enable delivery of DSL products and services. More information about the DSL Forum is available from its internet site http://www.dslforum.org.

One of those technical specifications is the DSL forum's Technical report TR-069 (e.g. issue 1, amendment 2, dating from December 2007 [also referred to as version v1.1 for the purpose of this description]), specifying the CPE WAN Management Protocol (also referred to as CWMP or TR-069). The TR-069 Management Protocol and corresponding network architectures allow communication between a Customer Premises Equipment (CPE) and an automatic configuration server (ACS). It defines a mechanism that encompasses secure auto-configuration of a CPE, and also incorporates other CPE management functions into a common framework.

The TR-069 protocol supports notifications of value changes in the object model of a remotely managed CPE. For each individual parameter, the ACS can mark the parameter for reporting value changes by modifying the notification attribute associated to that parameter.

Regarding parameter notification attributes, the TR-069 standard makes distinction between a 'passive' and 'active' notification strategy of parameter value changes (See for instance TR-069 v1.1 p52, Table 22, "Notification").

Both notification strategies differ in the promptness of reporting the value changes. A value change in one or more parameters marked as 'active' is reported immediately, i.e. 'active' notification triggers the CPE to establish a new session to the ACS. A 'passive' notification can be seen as a notification which is sent only when a new session is set up for other reasons.

Independent of the notification strategy being applied on parameters, the state of the art approach consists of reporting the value changes the next time the CPE initiates a session towards the ACS. More specifically, the CPE fulfills this requirement by embedding the new parameter value(s) in the next Inform message being sent to the ACS.

A problem of the current TR-069 protocol is that a new session must be established in order to report the value changes, after the pending earlier session is terminated.

SUMMARY OF THE INVENTION

When terms as "first", "second", "third" and the like are used, this does not necessarily mean that a sequential or that a chronological order is to be assumed.

The term "comprising", should be interpreted as such that it does not exclude other elements or steps.

In preferred embodiments of the present invention a remote management protocol (RMP) is used, which can advantageously be a CPE WAN management protocol (CWMP) defined by the DSL forum's Technical Report TR-069 (e.g. version V1.1 dating from December 2007, but also including earlier or future versions comprising the relevant functionalities, as would be recognised by the person of ordinary skill) for secure auto-configuration as well as other CPE management functions as for instance but not only dependency checking. In other words the TR-069 is a protocol for communication between a Customer Premises Equipment (CPE) and an automatic configuration server (further also referred to as ACS).

DSL forum's Technical report TR-069 (e.g. issue 1, amendment 2, dating from December 2007 (also referred to as version v1.1 for the purpose of this description)) is hereby incorporated by reference.

For the purpose of the present invention, the following terminology has been used, corresponding, unless mentioned otherwise, with the terminology of the TR-069 specification. The term "Device" is used in its ordinary sense and not as in TR-069. The CPE is TR-069 can thus be seen as an example of a device for the purpose of the present description.

ACS: Auto-Configuration Server: this is a means for automatically configuring a Customer Premises Equipment, e.g. a component in the broadband network responsible for auto-configuration of the CPE for advanced services. The ACS can also be used for lifecycle management of the services deployed on the CPE (It is to be noted that a collection of ACS's behind a load balancer is considered a single ACS for the purposes of this description).

CPE Customer Premises Equipment; an example of a device present at the customer premises. It preferably refers to any TR-069-compliant (or CWMP compliant) device. Examples of customer premises equipments are Set Top Boxes, internet/service gateway devices and LAN-side end devices, wireless sensor gateways, modems and telephones.

CWMP: CPE WAN Management Protocol (the subject of the standard TR-069)". It is to be noted that the internet gateway device (IGD) object model has further been defined in TR-098 of the DSL Forum.

RPC: Remote Procedure Call.

Session: a contiguous sequence of remote management protocol (RMP), e.g. CWMP) transactions between a device (e.g. CPE) and an automatic configuration means (e.g. ACS).

It is though to be noted that the terminology is applicable in a wider context than the specific TR-069 context.

The embodiments according to the present invention are moreover independent of the physical medium used.

The state of the art, on which the preamble of claim 1 is based, needs at least one extra RMP session in order to report the parameter value changes, which may create a burst of notifications.

Moreover time-critical value changes are not reported to the ACS sufficiently quickly (only possible as soon as the previous session is finished). It also generates extra load on the ACS because new sessions must be established (causing e.g. authentication overhead, etc.), which may also indirectly burden other CPE's that want to contact the ACS.

It is an object of the present invention to provide an improved method for automatically configuring a device (e.g. CPE) by means of an automatic configuration means (e.g. ACS), which solves at least one of the above problems.

A method is disclosed for automatically configuring a device by means of an automatic configuration means adapted for automatically configuring the device by means of a remote management protocol (RMP), comprising setting up an RMP session between the device and the automatic configuration means wherein when during the RMP session at least one parameter value of the object model of the device is changed, the device communicates the changed parameter value(s) to the automatic configuration means after the initiation and before the termination of the RMP session.

The object model of the device corresponds to the parameter tree (or data model) and the set of methods (or RPC's) that are applicable on that parameter tree.

An advantage(s) of the present invention over the state of the art is that a substantial increase in performance on the ACS-side is anticipated due to the in-session notifications, because no new TR-69 sessions must be established when parameter value changes of the object model of the device (as for instance the Customer Premises Equipment (CPE)) have to be transferred to the automatic configuration means (as for instance the Automatic Configuration Server (ACS)). This results in an improved scalability on the ACS-side (i.e. less overhead due to e.g. authentication, etc.) and an improved response time upon urgent notifications.

Further aspects of the present invention are described by the dependent claims. The features from the dependent claims, features of any of the independent claims and any features of other dependent claims may be combined as considered appropriate to the person of ordinary skill, and not only in the particular combinations as defined by the claims.

According to preferred embodiments of the present invention, the remote management protocol is CWMP as defined in TR-069 of the DSL Forum, and the device and the automatic configuration means are compatible with TR-069 of the DSL Forum. The automatic configuration means can be an automatic configuration server as defined in TR-069.

According to embodiments of the present invention, if more than one parameter value change occurs during the session, being of different parameters, the device communicates the changed parameter value(s) to the automatic configuration means contemporaneously.

For the purpose of the present invention, parameter value changes may be the result of one or more RPCs issued by the automatic configuration means, or may be the result of an independent or external event (e.g. by hardware).

According to certain embodiments of the present invention, if more than one parameter value change occurs during the session, being of the same or of different parameters, the device communicates the changed parameter value(s) to the automatic configuration means at different moments in time.

In embodiments of the present invention, the device transfers (or re-transfers or hands-over again) the control to initiate RPCs to the automatic configuration means before the end of the session and after a parameter value of the object model of the device has changed.

According to embodiments of the present invention, the device can send a new "Inform" message to the automatic configuration means after the automatic configuration means has sent an empty HTTP POST Response message to the device. The automatic configuration means may further request information from the device relating to which parameters and/or parameter tree(s) and/or which type of parameter notifications may be sent after the automatic configuration means has sent an empty HTTP POST Response message to the device. This can be implemented for instance but not only by means of a new RPC, via a Hand-Over RPC, or by overloading the empty POST message with parameter fields.

In embodiments according to the present invention, the automatic configuration means can request the changed parameter value information from the device by means of an appropriate Remote Procedure Call, before sending an empty HTTP POST Response message to the device.

According to embodiments of the present invention, the total number of communications of parameter value changes during a session is limited to a certain maximum number of times. This can be specified by the protocol itself or may be specified when the request is issued. In case the protocol doesn't specify a limit, it can be the ACS that controls the maximum number of communications of parameter value changes (CPE-side control of number of communications is less preferred because traffic problems can only occur on the ACS side). This can be done for instance by means of an extra field/argument specifying the maximum number of communications of parameter value changes in the InformResponse (implicit hand-over) message. Note that by adding this field/argument in the Inform message, it is indicated to the ACS that the CPE supports the in-session notifications TR-069 extension according to embodiments of the present invention. Alternatively, this can be done by means of an extra field/argument in the first HandOver Request message, or by allowing only one communication of parameter value changes with the HandOver request message (explicit hand-over scenario).

The CPE can also indicate the maximum of communications of parameter value changes it is ready to perform in the actual session for instance as follows:
  implicit hand-over scenario: the CPE communicates the maximum number of communications of parameter value changes it is willing to perform in the first Inform message. Based on this maximum, the ACS can decide how much communications of parameter value changes it will allow in the session.
  explicit hand-over scenario: the ACS imposes a maximum of communications of parameter value changes in the HandOver request message, the CPE can then acknowledge the agreed number in the HandOver response message.

According to a further aspect of the present invention, also devices as for instance CPEs, being adapted for being used in the previously described methods are disclosed. Such devices must be adapted and/or arranged such that they allow the respective method described above to be performed.

According to a further aspect of the present invention, also an automatic configuration means as for instance an ACS, being adapted for being used in the previously described methods are disclosed. Such automatic configuration means must be adapted and/or arranged such that it allows the respective method described above to be performed.

BRIEF DESCRIPTION OF THE DRAWINGS

The accompanying drawings are used to illustrate embodiments of the present invention.

Reference signs are chosen such that they are the same for similar or equal elements or features in different figures or drawings.

DESCRIPTION OF ILLUSTRATIVE EMBODIMENTS

The above and other advantageous features and objects of the invention will become more apparent and the invention will be better understood from the following detailed description when read in conjunction with the respective drawings.

The description of aspects of the present invention is performed by means of particular embodiments and with reference to certain drawings but the invention is not limited thereto. Depicted figures are only schematic and should not be considered as limiting. E.g. certain elements or features may be shown out of proportion or out of scale with respect to other elements.

In the description of certain embodiments according to the present invention, various features are sometimes grouped together in a single embodiment, figure, or description thereof for the purpose of aiding in the understanding of one or more of the various inventive aspects. This is not to be interpreted as if all features of the group are necessarily present to solve a particular problem. Inventive aspects may lie in less than all features of such a group of features present in the description of a particular embodiment.

While some embodiments described herein include some but not other features included in other embodiments, combinations of features of different embodiments are meant to be within the scope of the invention, and form different embodiments, as would be understood by the skilled person.

In embodiments according to the present invention, in-session (e.g. in-TR-069-session) notification is introduced. According to embodiments of the present invention, parameter value changes for 'passive' and 'active' notifications can be retrieved during or at the end of an established TR-069 session with the ACS.

Figure 1:
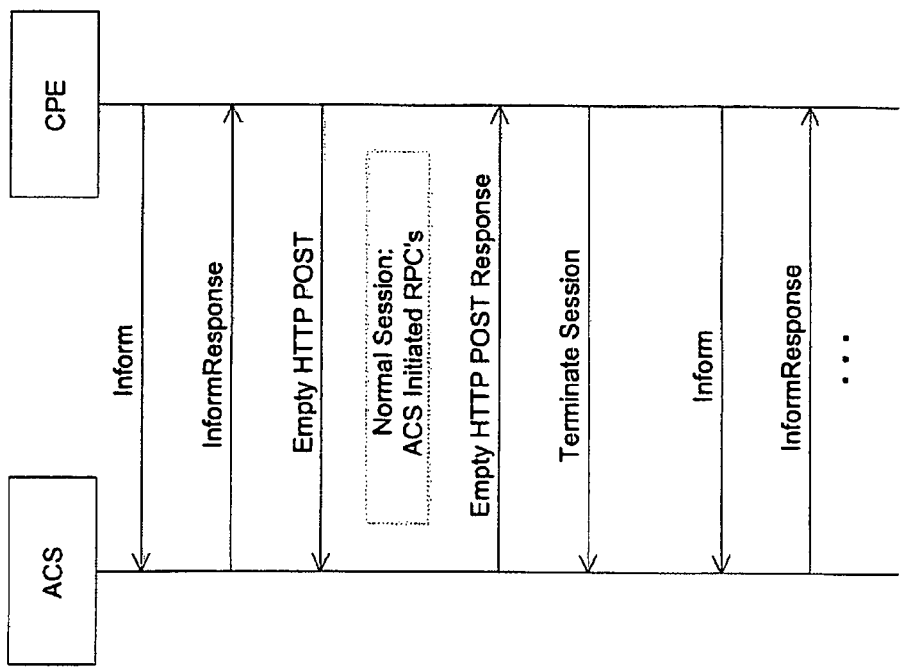
FIG. 1 illustrates the prior art solution.

In FIG. 1 the prior art scenario is depicted. A customer premises equipment (CPE) initiated a RMP (e.g. TR-069) session with the respective Automatic Configuration Server (ACS) and therefore sends an Inform message to this Automatic Configuration Server (ACS). This Inform message may comprise previously changed parameter values of the object model of the CPE and further information according to TR-069 v1.1. The ACS acknowledges receipt with a Inform-Response Message. A mechanism existing in the current TR-069 specification is now used to transfer the control of initiating RPCs from the CPE to the ACS; an empty HTTP(S) POST message is sent, after which the ACS can initiate RPCs. When the ACS has finished the necessary RPCs, a similar mechanism is used to transfer the control of initiating RPCs back from the ACS to the CPE; an empty HTTP POST Response Message is sent to the CPE, which according to the current standard TR-069 v1.1, interprets this as a signal to terminate the HTTP(S) session. If parameter value changes occurred to the object model of the CPE during the session, currently a new session is necessary to transfer the changed parameters. This can be active, i.e. by means of a dedicated session following the first session, or passive, i.e. by integrating the information in the Inform message from the CPE to the ACS in a subsequent session started for other reasons. This other reasons can be e.g. dedicated to another purpose, or a dedicated periodical update session.

FIGS. 2, 3, 4 and 5 illustrate embodiments according to the present invention for in-session TR-069 notifications.

According to embodiments of the present invention, the CPE hands over the control of initiating RPCs back to the ACS, by responding with a new Inform message after having received the Empty POST Response message from the ACS. Reaching the end of a state of the art regular session, the ACS sends an empty POST Response message to the CPE to indicate that it has no more RPC's to issue, and to give control back to the CPE. In the state of the art, the CPE interprets this empty POST response by terminating the session. According to embodiments of the present invention, the CPE has the opportunity to get back the control over RPC's and to send further notifications within the current session. The ACS and CPE need thus to be adapted for providing this functionality. This gives the CPE a new opportunity to call ACS-side RPC's, as for instance but not only by means of the Inform message, which may comprise information regarding the parameter values which have been changed during the session.

According to certain embodiments, the Inform RPC only can be called, with or without a particular event-type(s) (e.g. value change, but also: periodic, transfer complete, etc.). It is noted that the Inform message can be used for sending in-session notifications, but this should not be limited to the Inform message only. In other words, any new ACS RPC that could be defined for this purpose may be used.

Figure 2:
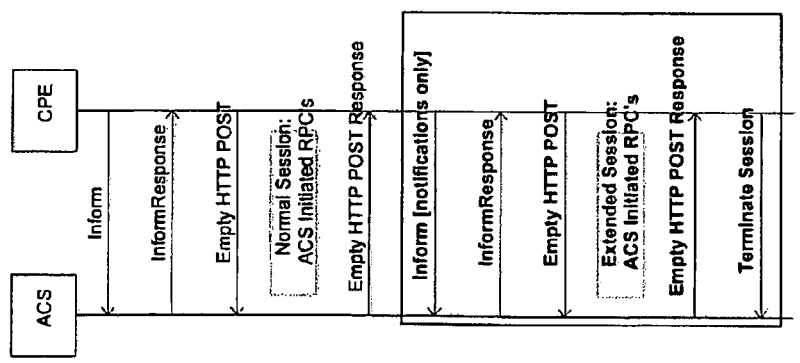
FIG. 2 and FIG. 3 illustrate embodiments according to the present invention corresponding to implicit and explicit handover scenarios respectively.
Figure 3:
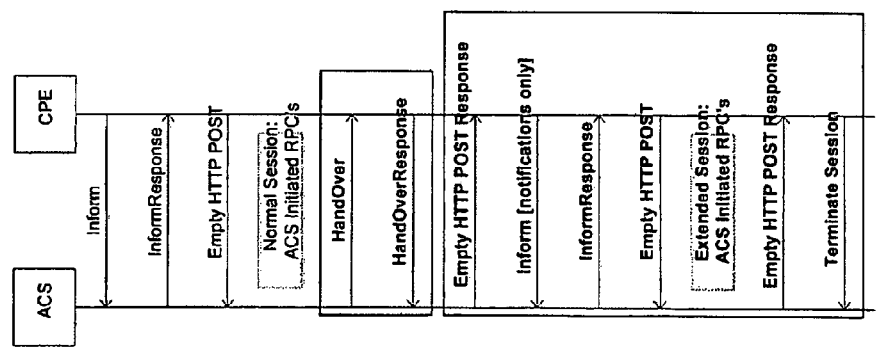
Figure 4:
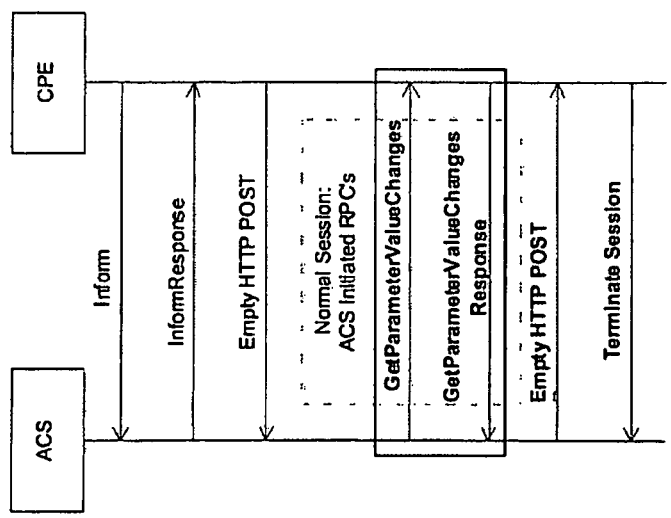
FIG. 4 illustrates an embodiment according to the present invention in which a new CPE-side Remote Procedure Call (RPC) is proposed.

According to certain embodiments of the present invention (called Implicit Hand-Over for the purpose of the present description, illustrated in FIG. 2), the Hand-Over of the control of initiating RPC's is performed via Empty Messages. As an alternative to the standard TR-069 v1.1, in this embodiment, the CPE is given the opportunity to send a new Inform message after the CPE received the empty HTTP POST response from the ACS. This enables the CPE to send awaiting notifications in the current TR-069 session. The ACS then acknowledges with an InformResponse message, after which the CPE again transfers the control of initiating RPCs to the ACS by sending an empty HTTP(S) POST. This results in a certain view in an extended session in which the ACS performs the RPC's which are necessary because of the changed parameter values of the object model of the CPE during the same session.

According to embodiments of the present invention, the CPE can decide to terminate the session instead of sending an empty POST message, after the Inform/InformResponse message exchange.

In order to keep the sessions not too long open, in certain embodiments of the present invention, the CPE can be limited to send only 1 or a predetermined maximum in-session Inform messages per session.

According to other embodiments of the present invention (called Explicit Hand-Over for the purpose of the present description) the hand-over is performed by means of a new RPC (as for instance illustrated in 3).

In those embodiments, the ACS issues an explicit request to the CPE for sending pending notifications. For this purpose, a new RPC can be defined, e.g. HandOver (from ACS to CPE)/ HandOverResponse (from CPE to ACS). The HandOverResponse or response to this request from the CPE can comprise information for the ACS regarding what type of notifications the ACS may expect to receive, or information relating to a restriction of the parameters of the parameter tree to a subset thereof, after the moment that the standard empty HTTP(S) POST Response message has been sent from the ACS to the CPE.

According to further embodiments of the present invention, parameters are retrieved by means of a new RPC (with respect to TR-069 v1.1., e.g. illustrated in FIG. 4)). In case of a new CPE-side RPC (being implemented at CPE-side, and called by the ACS-side), the RPC retrieves parameter value changes, and can for instance be called GetParameterValueChanges. In such embodiments, the ACS keeps control of the session (i.e. control over the initiation of RPC's).

Figure 5:
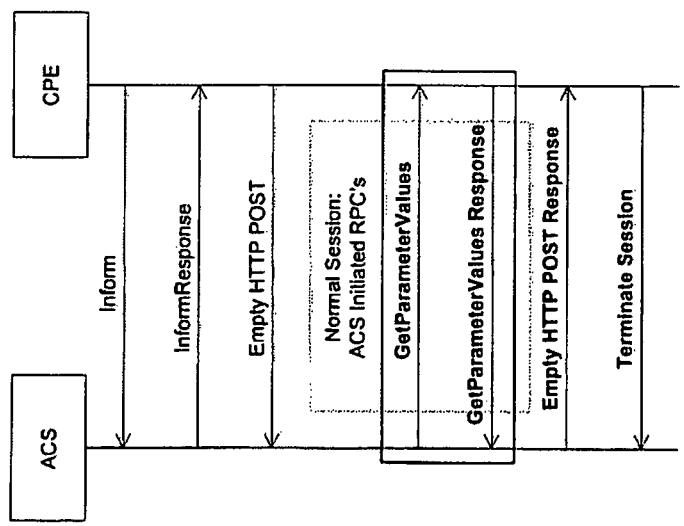
FIG. 5 illustrates an embodiment of the present invention in which a modification of a state of the art RPC is proposed.

According to further embodiments of the present invention, a state of the art RPC can be modified for instance by extending an existing RPC with new arguments (e.g. illustrated in FIG. 5). An example of such an existing RPC which could be modified for the purpose of the present invention, is the GetParameterValues RPC.

Optionally, this RPC can contain some extra arguments which refine the retrieval of parameter value changes, e.g.:

an argument by which the ACS can order the CPE to return 'active'-only parameter changes, 'passive'-only parameter changes or both types of parameter changes.

and/or an argument which provides a functionality of parameter name filtering (e.g. with a parameter root object, wildcards, etc.) This option allows restricting in-session notification reporting to a subset of the whole parameter tree (or to specific parameters) from the object model. This can be useful to filter out more urgent notifications from less urgent, not urgent or only informative ones, based on for instance the parameter name.

While the principles of the invention have been set out above in connection with specific embodiments, it is to be clearly understood that this description is merely made by way of example and not as a limitation of the scope of protection which is determined by the appended claims.

The invention claimed is:

1. Method for automatically configuring a device using an automatic configuration server configured to automatically configuring said device by means of a remote management protocol (RMP), comprising:

setting up an RMP session between said device and said automatic configuration server wherein when during said RMP session at least one parameter value of an object model of said device is changed, said device communicates said changed parameter value(s) to said automatic configuration server after initiation and before termination of said RMP session.

2. Method according to claim 1, wherein said remote management protocol is a Customer Premises Equipment WAN Management Protocol (CWMP) as defined in TR-069 of the DSL Forum, and wherein said device and said automatic configuration server are compatible with TR-069 of the DSL-Forum.

3. Method according to claim 1, wherein if more than one parameter value change occurs during said session, being of different parameters, said device communicates said changed parameter value(s) to said automatic configuration server contemporaneously.

4. Method according to claim 1, wherein more than one parameter value change occurs during said session, being of the same or of different parameters, and wherein said device communicates said changed parameter value(s) to said automatic configuration server at different moments in time.

5. Method according to claim 2, wherein said device transfers the control to initiate RPCs to said automatic configuration server before the end of said session and after a parameter value of said object model of said device has changed.

6. Method according to claim 5, wherein said device sends a new Inform message to said automatic configuration server after the automatic configuration server has sent an empty HTTP POST Response message to said device.

7. Method according to claim 6, wherein said automatic configuration server sends a request from said automatic configuration server requesting information from said device on at least one of which parameters, which parameter trees and which type of parameter notifications are permitted to be sent after the automatic configuration server has sent an empty HTTP POST Response message to said device.

8. Method according to claim 2, wherein said automatic configuration server requests said changed parameter value information from said device by means of an appropriate Remote Procedure Call, before sending an empty HTTP POST Response message to said device.

9. Method according to claim 1, wherein a total number of communications of parameter value changes during a session is limited to a certain maximum number of times.

10. A device adapted for being used in the method according to claim 1.

11. An automatic configuration server adapted for being used in a method according to claim 1.

* * * * *